United States Patent [19]

Kovalchick et al.

[11] Patent Number: 4,721,357

[45] Date of Patent: Jan. 26, 1988

[54] METHODS OF AND APPARATUS FOR RECONFIGURING OPTICAL FIBER CONNECTOR COMPONENTS AND PRODUCTS PRODUCED THEREBY

[75] Inventors: Joseph S. Kovalchick, Middlesex County, N.J.; John M. Palmquist, Gwinnett County, Ga.; Ralph A. Treder, Jr., Mercer County, N.J.

[73] Assignee: American Telephone and Telegraph Company, AT&T Technologies, Inc., Berkeley Height, N.J.

[21] Appl. No.: 802,492

[22] Filed: Nov. 27, 1985

[51] Int. Cl.$^4$ ............................................. G02B 6/36
[52] U.S. Cl. ................................ 350/96.20; 350/96.21
[58] Field of Search ................ 350/96.20, 96.21, 320; 356/73.1, 153

[56] References Cited

U.S. PATENT DOCUMENTS

| | | | |
|---|---|---|---|
| 4,512,630 | 4/1985 | Runge | 350/96.21 |
| 4,615,581 | 10/1986 | Morimoto | 350/96.20 |
| 4,673,245 | 6/1987 | Kling et al. | 350/96.2 |

OTHER PUBLICATIONS

W. C. Young et al., "Low-loss field-installable biconic connectors for single mode fibers" Paper MG 4 OFC '83. 28 Feb–2 Mar., 1983.

N. K. Chueng et al., "An Automatic Inspection System for Single Fiber Connector Plugs" Symposium on Optical Fiber Measurements 1980.

*Primary Examiner*—Eugene R. Laroche
*Assistant Examiner*—James C. Lee
*Attorney, Agent, or Firm*—Edward W. Somers

[57] ABSTRACT

A biconic connector includes two plugs (44—44) each of which terminates a single fiber optical cable (55) and each of which includes a conically shaped end portion (50). The connector also includes an alignment sleeve having back-to-back conically shaped cavities each of which is adapted to receive an end portion of a plug. In order to minimize loss through a connection, it becomes important for the axis of the end portion of the core of the optical fiber in the conically shaped end portion of the plug to be coincident with the axis of revolution of the conically shaped end portion. This is accomplished by holding the plug in a fixture such that its conically shaped end portion is exposed and the fixture adapted to be turned about an axis of rotation. Images of light launched into the optical fiber are acquired in two planes at a plurality of positions spaced apart along a reference axis. The center of rotation of the turntable and the relative angle of the light emitted from the end portion of the plug are resolved from these images. A device (180) is positioned over an end of the conically shaped portion of the plug and used to determine the angle between the axis of revolution of the plug and the axis of rotation of the fixture. The direction of the axis of the fiber core is then determined and the fixture is oriented to cause the axis of the fiber core to be parallel to the axis of rotation. Adjustments are then made to cause the center of the images and the center of the fiber core to be coincident with the axis of rotation. Subsequently, the end portion of the plug is reconfigured such as by grinding to cause the axis of revolution of the reconfigured end portion and the axis of the optical fiber core to be substantially coincident.

24 Claims, 36 Drawing Figures

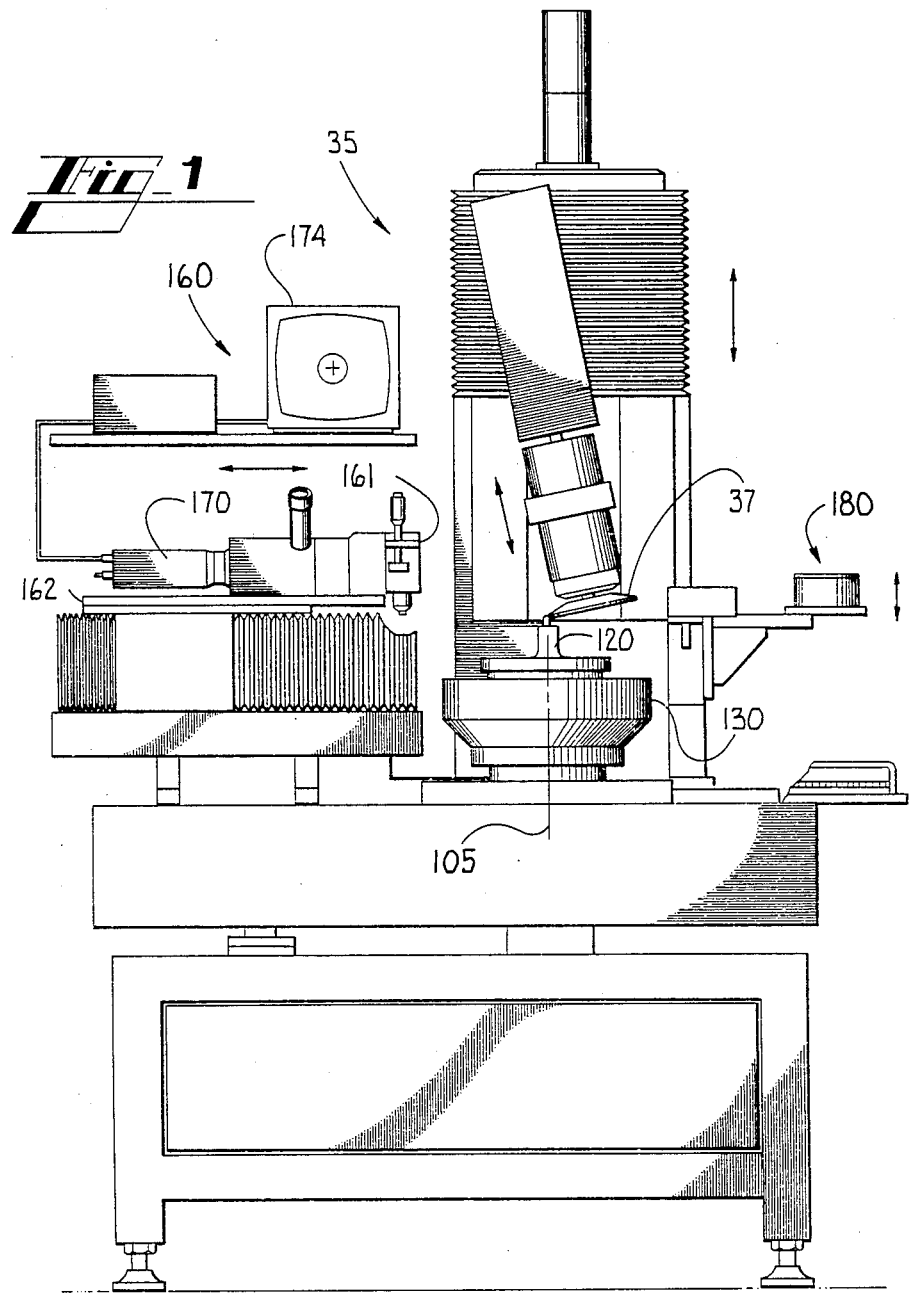

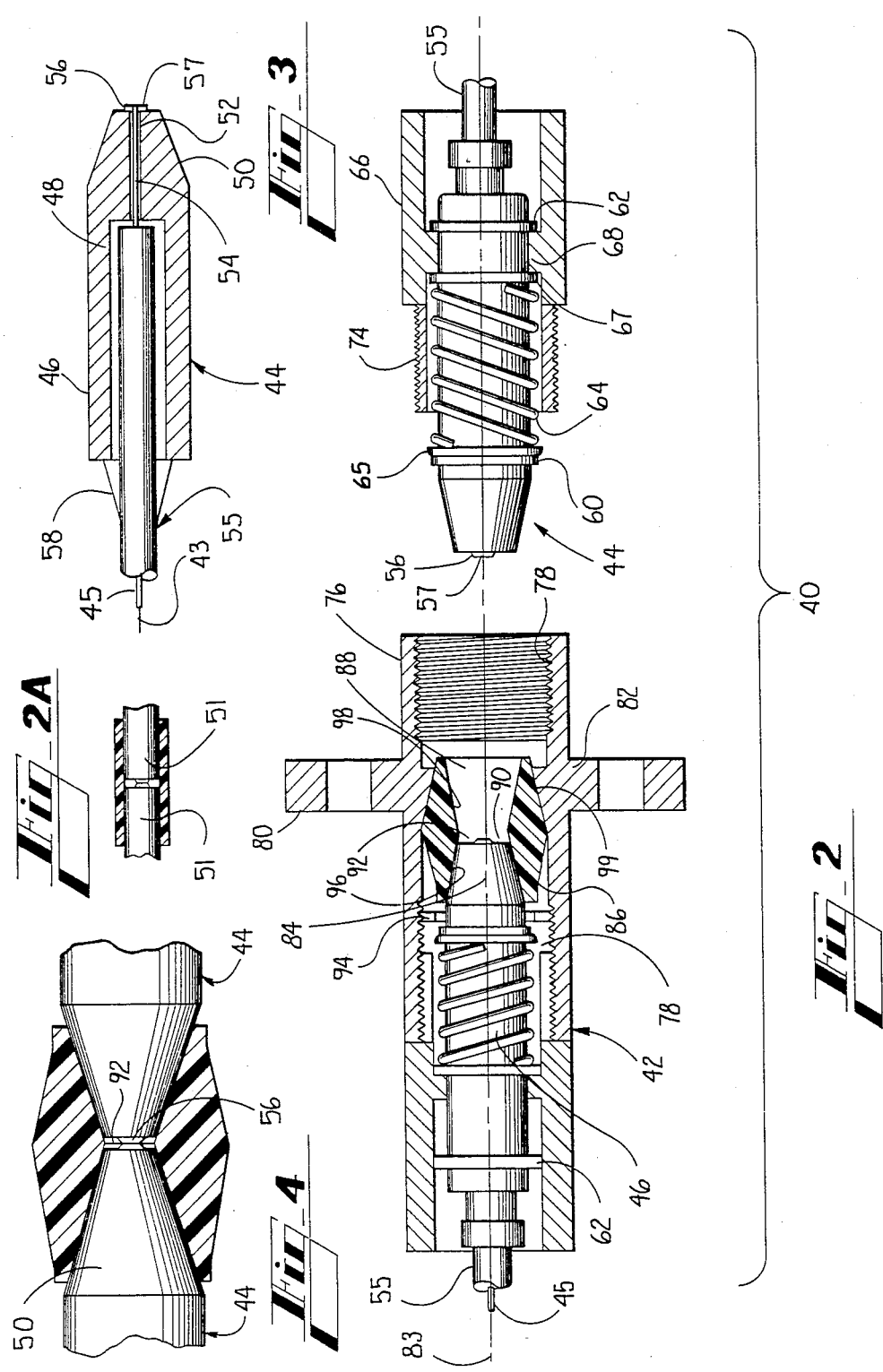

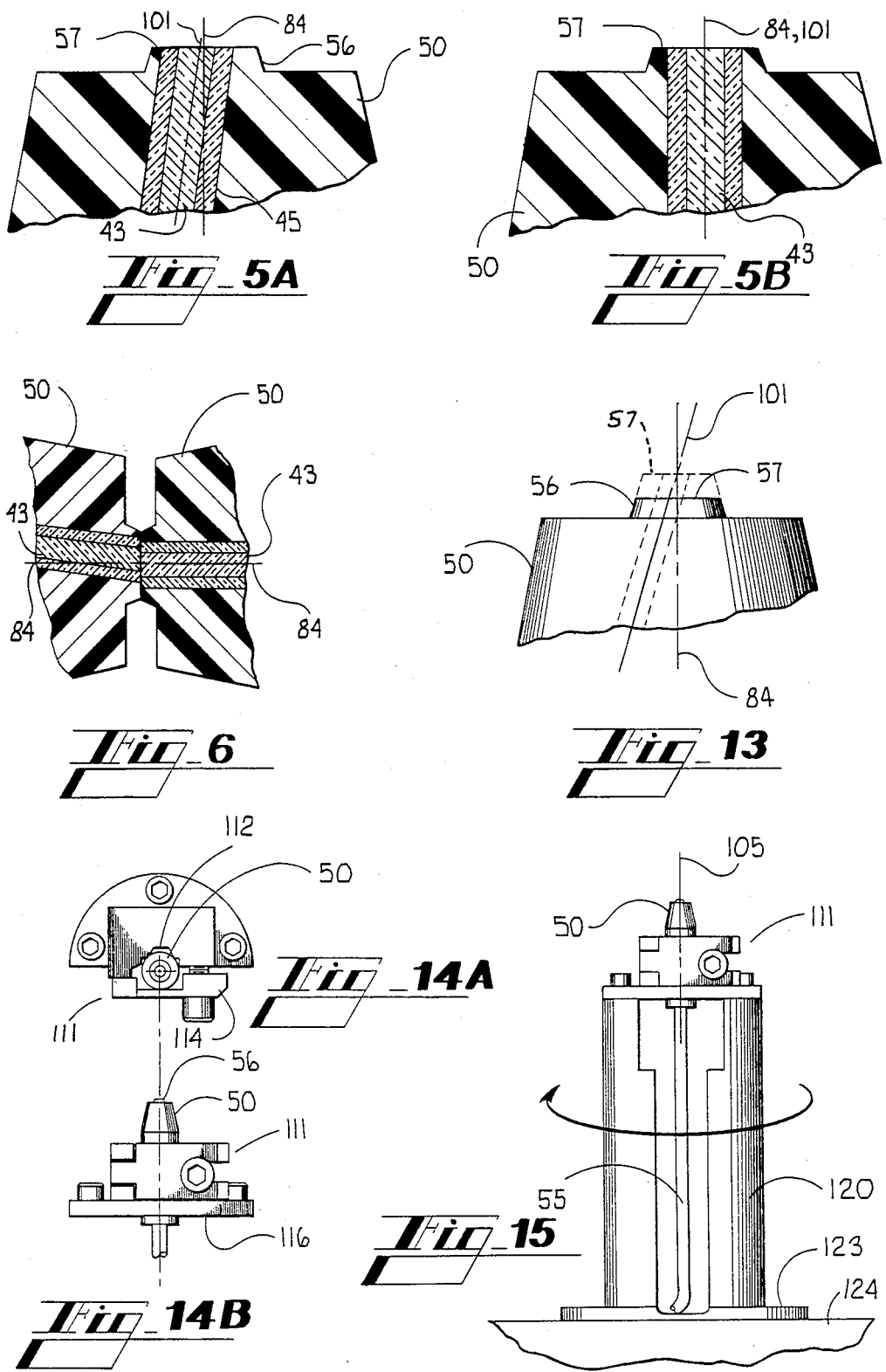

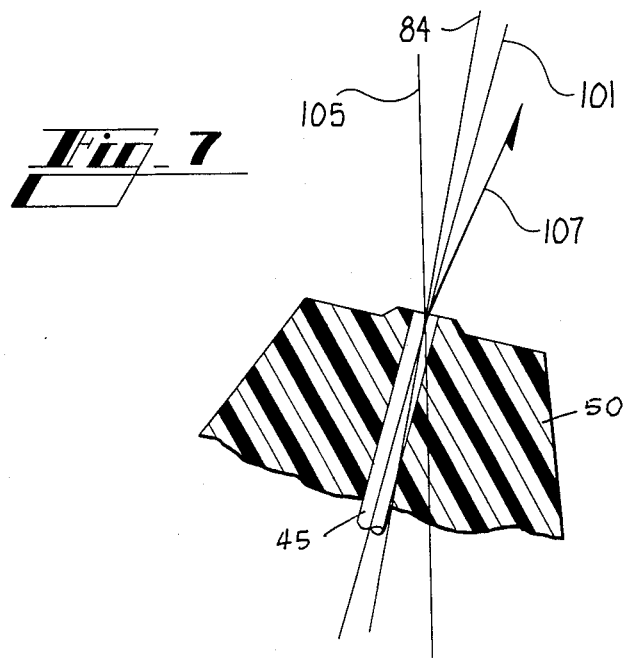
Fig_7
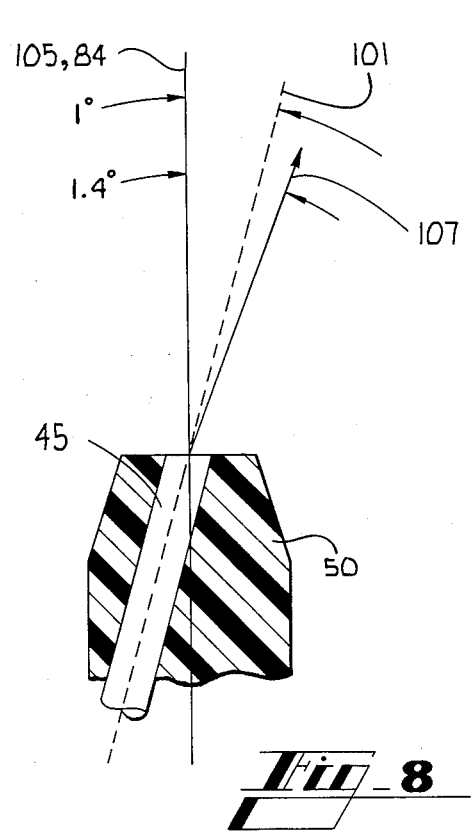
Fig_8
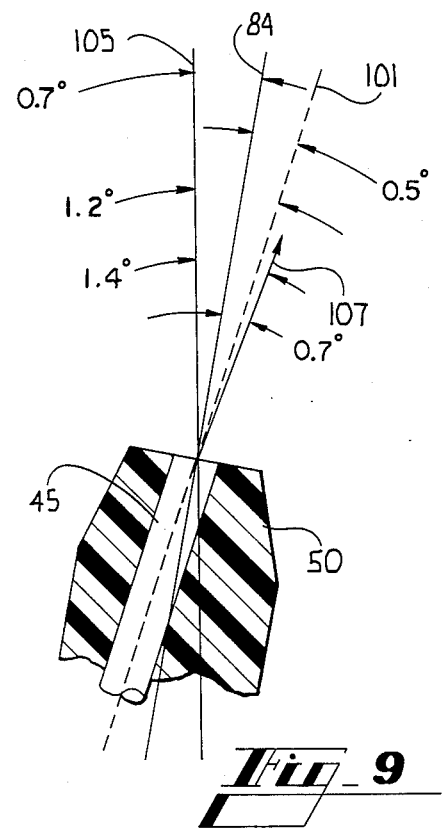
Fig_9

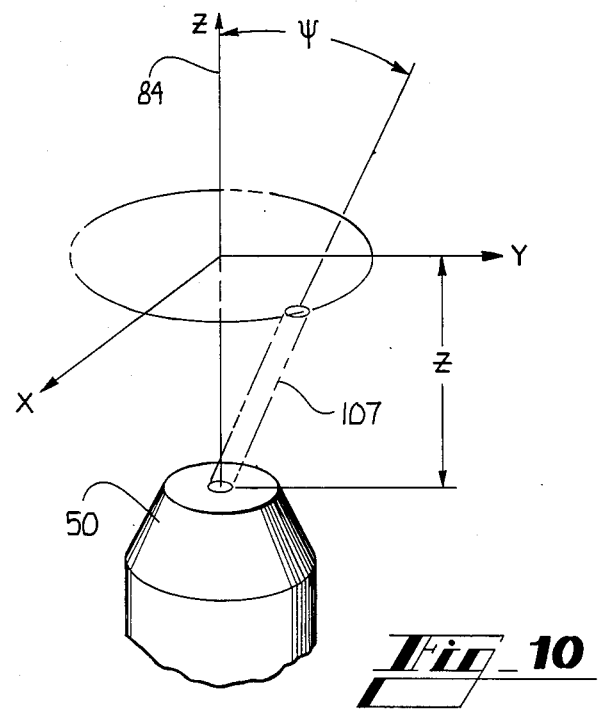
Fig_10
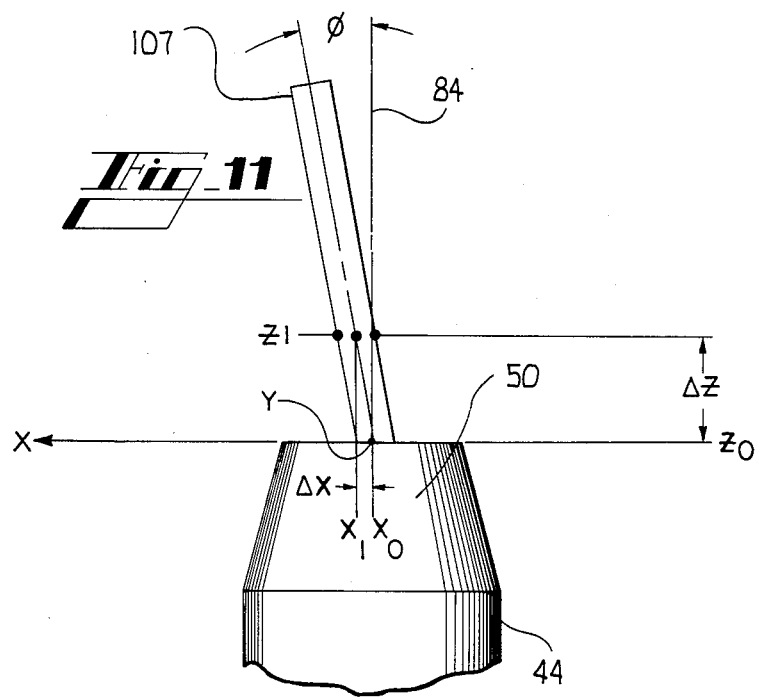
Fig_11

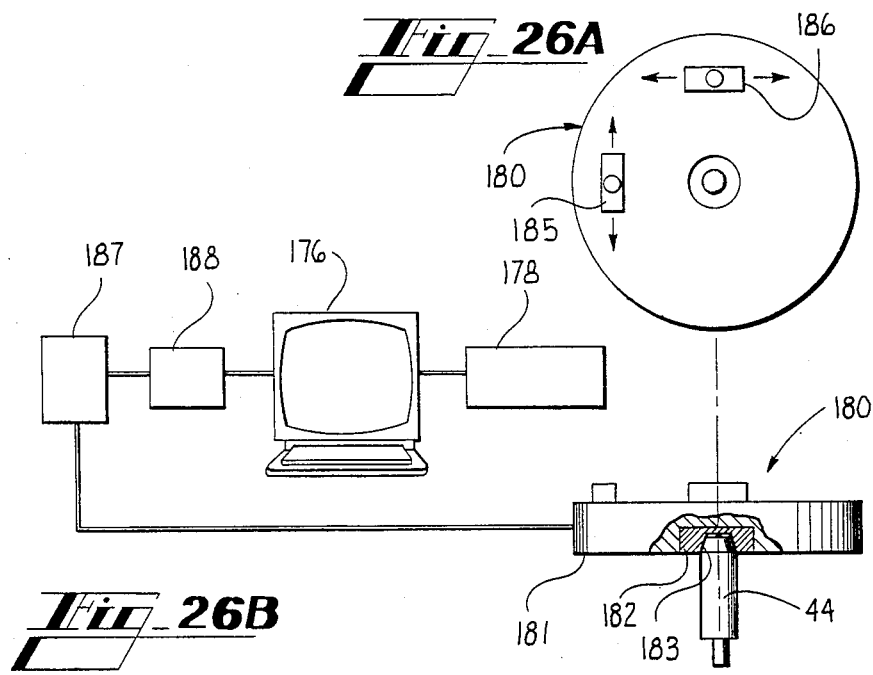
Fig. 26A
Fig. 26B
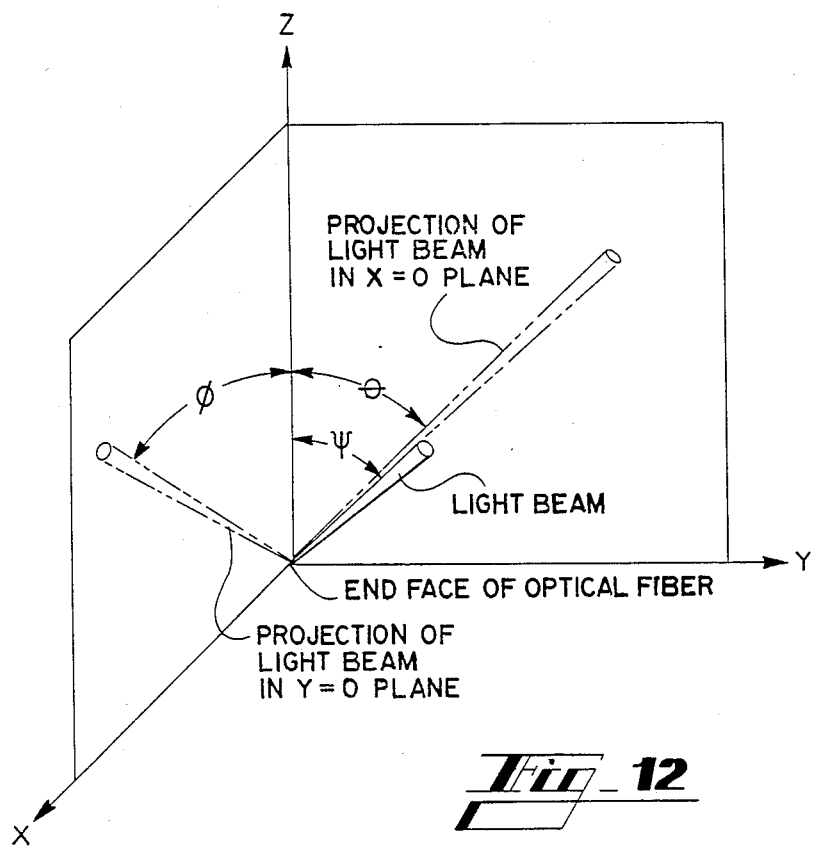
Fig. 12

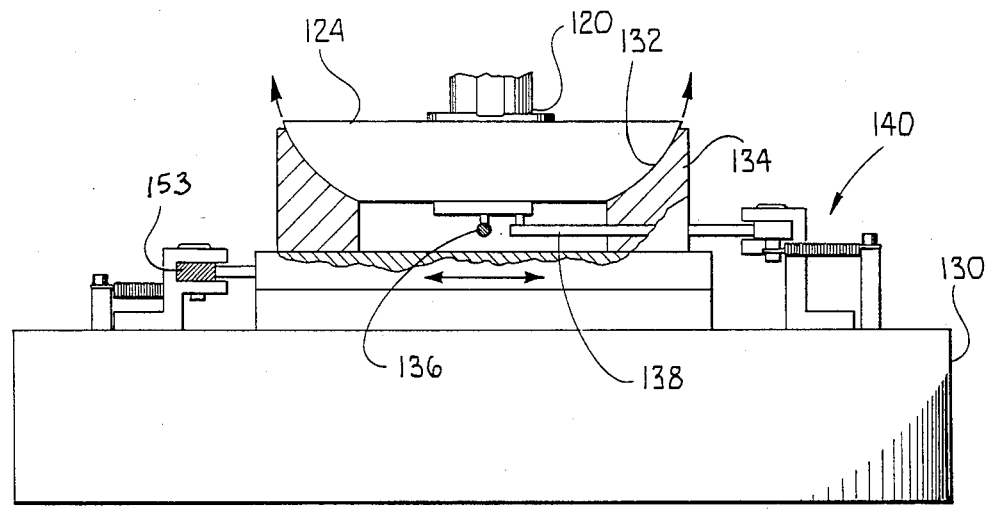
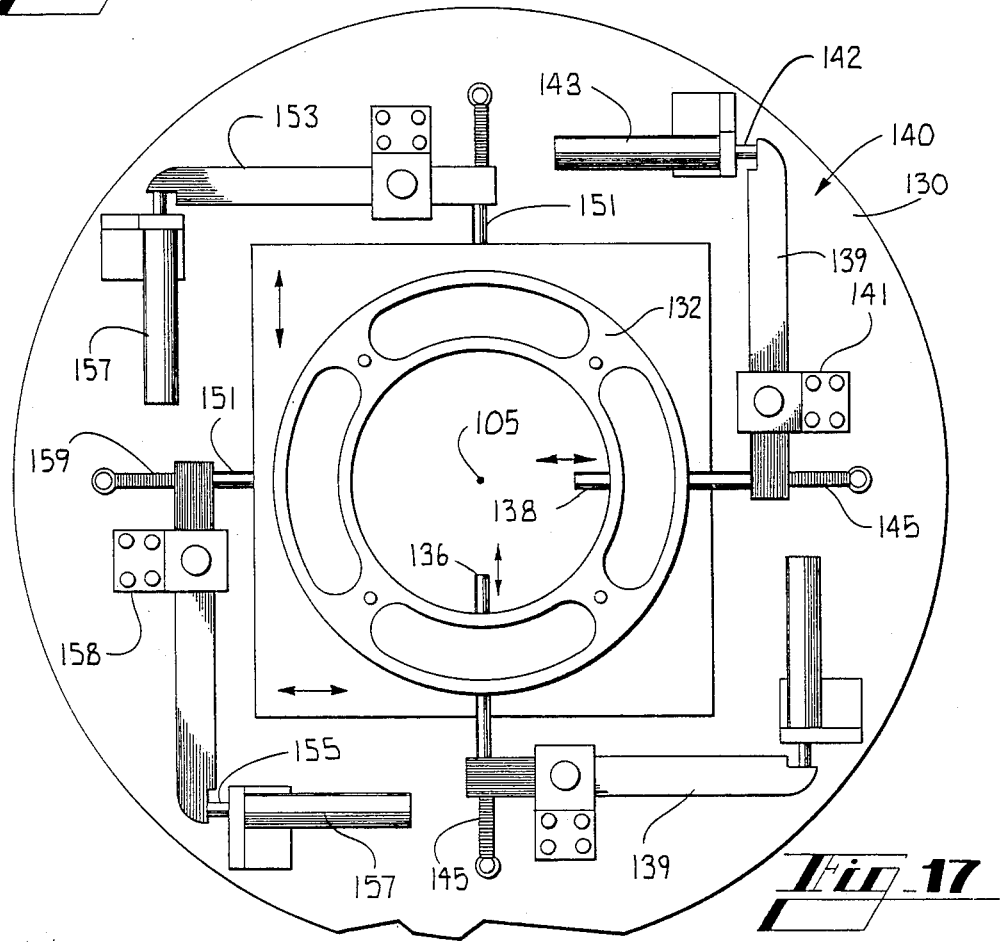

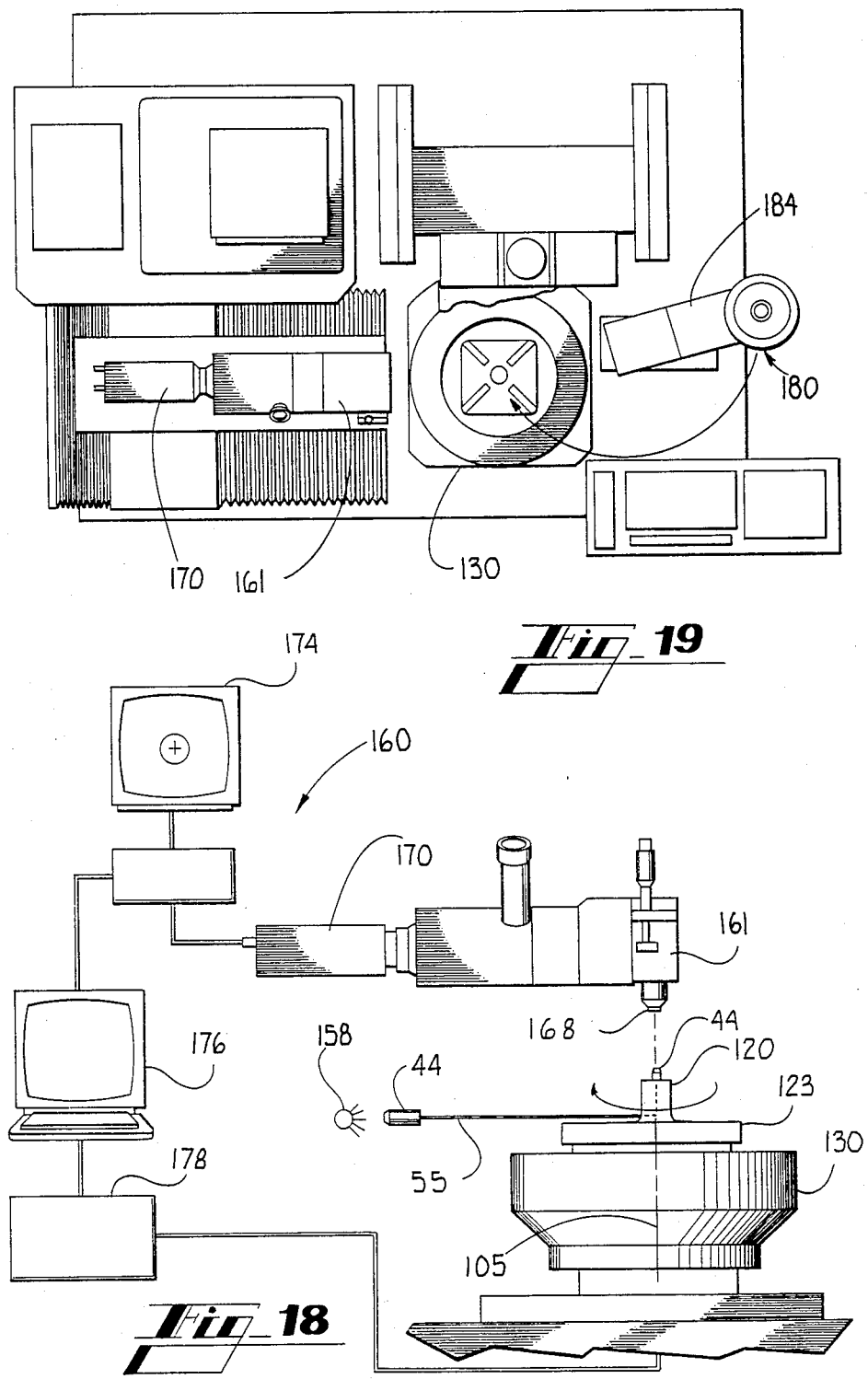

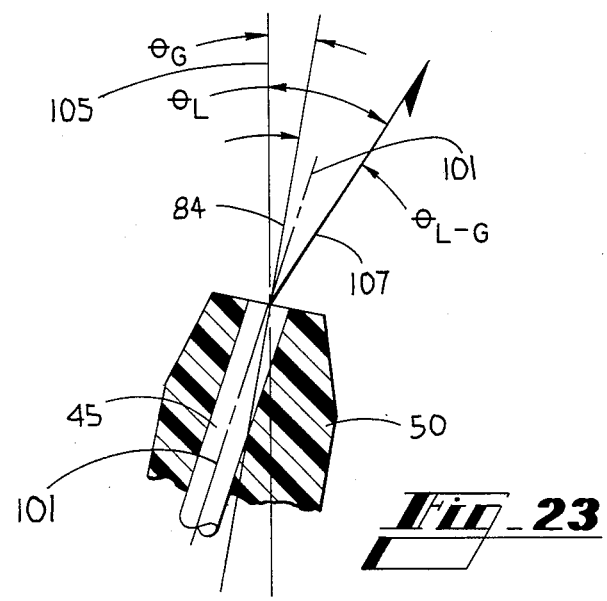
*Fig_23*
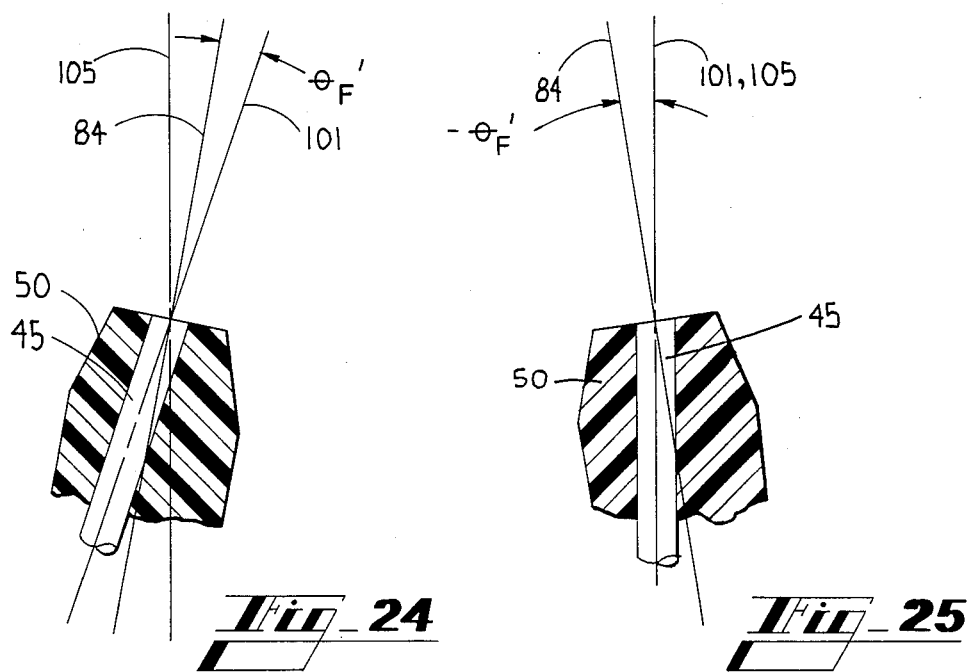
*Fig_24*  *Fig_25*

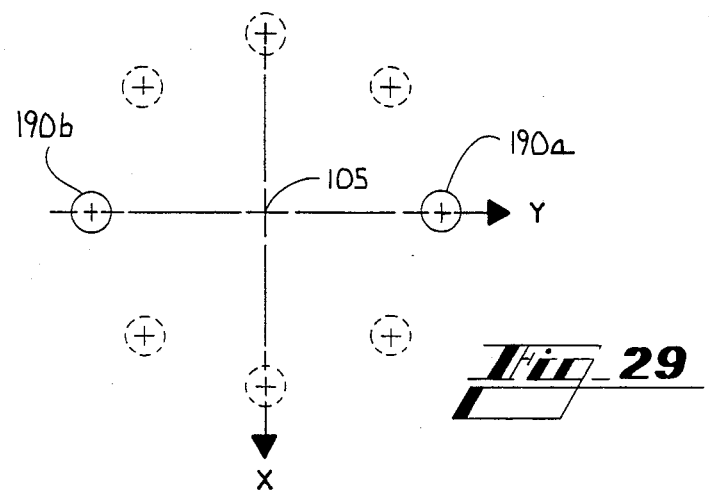
_Fig_29
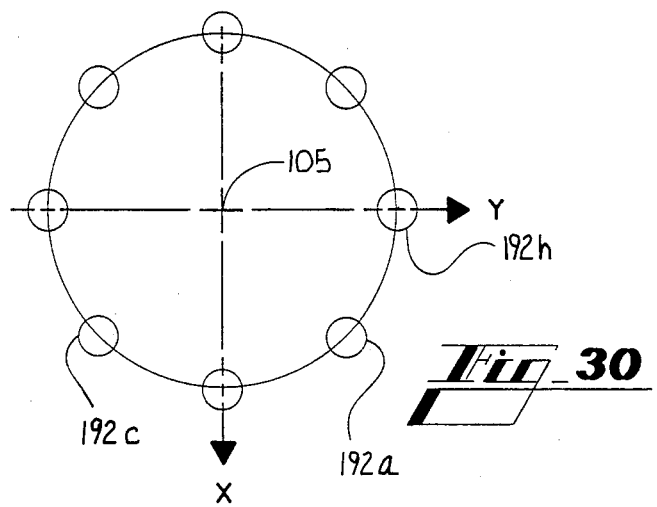
_Fig_30
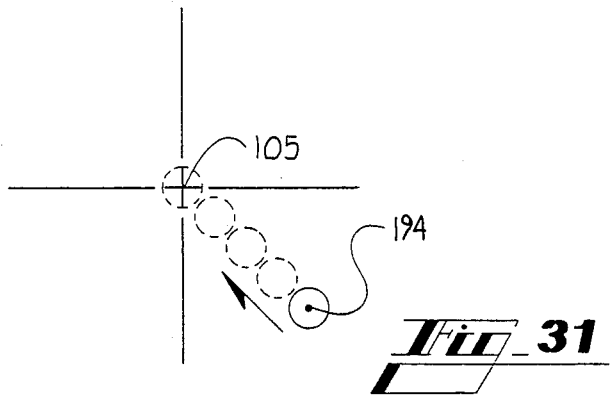
_Fig_31

METHODS OF AND APPARATUS FOR RECONFIGURING OPTICAL FIBER CONNECTOR COMPONENTS AND PRODUCTS PRODUCED THEREBY

TECHNICAL FIELD

This invention relates to methods of and apparatus for reconfiguring optical fiber connector components and products produced thereby. More particularly, this invention relates to post-molding methods and apparatus for grinding optical fiber termination plugs to cause a centroidal axis of a passageway therethrough or fiber core therein to be coincident with the axis of revolution of a conical surface of the plug so that when the plugs are mounted in an alignment sleeve, the fiber cores are aligned.

BACKGROUND OF THE INVENTION

The use of optical fibers in communications is growing at an unprecedented rate. Low loss optical fibers which are produced by any one of several techniques may be assembled into ribbons which are then assembled into cables, or stranded into cables, or they may be enclosed singularly in a jacket and used in various ways in a central office, for example.

In order to assure that the low loss fibers which are produced today are not diminished in their effectiveness in systems, the fibers must be connected through intermateable connectors which preserve those low losses. For fiber ribbons, connectors comprise grooved chips which hold a plurality of fibers of one ribbon in alignment with fibers of another ribbon. Such a connector is shown for example in U.S. Pat. No. 3,864,018 which issued on Feb. 4, 1975 in the name of C. M. Miller.

For single fiber cables, connections may be made through a connector which is referred to as a biconic connector. See U.S. Pat. Nos. 4,107,242 and 4,512,630 which issued on Aug. 15, 1978 and Apr. 23, 1985, in the name of P. K. Runge. That connector includes a housing in which is mounted a biconic alignment sleeve. The sleeve includes two truncated, conically shaped cavities which communicate with each other through a common plane which has the least diameter of each cavity. Each of two fibers to be connected is terminated with a plug comprising a primary pedestal or truncated, conically shaped end portion which is adapted to be received in one of the cavities of the sleeve. The conically shaped surfaces of the plug and of the sleeve serve as alignment surfaces. The fiber extends through a passageway in the plug and has an end which terminates in a secondary pedestal of the plug. Generally, a plug is molded about an end portion of an optical fiber; however there is a demand for plugs having passageways molded therein for the field termination of optical fibers. A cylindrically shaped portion of the plug is connected to the truncated end. The plug is urged into seated engagement with the wall defining the cavity in which it is received.

Minimal loss between the connected fibers is achieved when the cores of fibers which are terminated by the plugs are aligned coaxially and when the longitudinal offset along the axes of the plugs is zero and fiber end faces, each of which is planar, contact in a common plane. Considering the size of the fibers, for example one with a core diameter of 8 microns and a cladding diameter of 125 microns, the task of providing conical plug and sleeve surfaces in order to meet alignment and end separation requirements is a formidable one. Generally, the plugs are molded from a transfer molding grade epoxy composition material. Although the surface tolerances which are achieved when molding the alignment sleeves and conic tapers are excellent, they are not sufficient to achieve consistently the desired alignment and end separation.

Problems arise because the opening in the end face of the pedestal and hence the fiber core may not be centered with respect to the axis of revolution of the truncated, conically shaped end portion. The axis of revolution of the conically shaped end portion may also be referred to as the conical axis. As a result, the cores of the fibers terminated by two plugs held in the sleeve may have sufficient transverse or lateral offset to affect adversely the transmission of signals. This problem has been overcome by the methods and apparatus of copending, commonly assigned application Ser. No. 802,500 filed of even date herewith in the names of R. P. Lyons et al. Also the centroidal axis of the end portion of the core of the fiber disposed in the passageway may not be coincident with to the axis of revolution of the conically shaped end portion of the plug. Consequently, the light emitted from one fiber may not be parallel to the axis of the receiving fiber. This problem which is referred to as angular offset may also occur when the plug is molded about an end portion of an optical fiber. The angle between the fiber axis and the axis of revolution of the plug end portion is commonly referred to as the exit angle of the plug.

Control of the exit angle as well as that of lateral offset is essential for achieving low loss connections and high yields in optical fiber connector manufacture. The control of these parameters insures that when two plugs are disposed in an alignment sleeve, not only will the end faces just touch, but the fiber axes will be substantially coaxial.

Seemingly, the prior art is devoid of a simple solution to the problem of providing production plugs at a relatively high yield for biconic connectors which may be used for multi or single mode lightguide fibers. Each production plug must be such that a centroid of the core of an optical fiber terminated therein in an end face of the plug is coincident with the axis of revolution of the truncated, conically shaped surface of the plug and such that the centroidal axis of the end portion of the fiber core in the plug is coaxial with the axis of revolution of the end portion of the plug. Desirably, the solution does not require additional elements or time in the connection procedures, but instead involves an automatic reconfiguration of molded plugs to achieve precision without the need of a skilled machinist. What is needed are methods and apparatus for measuring the exit angle and for correcting the exit angle of a plug by aligning the fiber core axis with the axis of rotation of a turntable on which the plug is held and reconfiguring a new end portion having an axis of revolution which is coaxial with the fiber core axis.

SUMMARY OF THE INVENTION

The foregoing problems have been solved by the methods and apparatus of this invention. A method is provided to reconfigure an end portion of a plug, which includes a passageway within which is adapted to be disposed as an end portion of the fiber to occupy a predetermined position with well as an end portion of the fiber to occupy a predetermined position with respect to an alignment surface of the end portion of the plug.

The plug is held on a support, having an axis of rotation, in such a manner that the end portion of the plug is exposed. Relative motion is caused between the axis of rotation and the plug to cause a centroidal axis of a beam of light within the end portion of the plug to be parallel to the axis of rotation. In this application, centroid of a core of the optical fiber or of the beam of light is defined as the center of mass of a thin, uniform plate having the same transverse cross-section as the core or light beam. The centroidal axis is a line determined by two spaced centroids of the core or beam of light. Then the centroid of the cross-sectional area of a light beam emitted from the plug end is determined and is caused to coincide with the axis of rotation in an end face of the plug. Afterwards, the end portion of the plug is reconfigured to cause the centroidal axis of the beam of light in the end portion of the plug to be in a predetermined location with respect to an alignment surface of the reconfigured end portion.

Typically, an end portion of an optical fiber is inserted into a passageway of a molded plug or a plug is molded about the fiber so that the fiber extends slightly past a pedestal of a truncated conically shaped end portion of the plug. The optical fiber is severed, and the fiber end and end of the pedestal are polished in such a way as to cause the end face to be perpendicular to the axis of revolution of the end portion of the plug.

As a result of imaging emitted light from near and far field planes at the end of interest when a beam of light is projected into the other end of the optical fiber, the angle which the beam of light makes with a rotational axis of a turntable on which the plug is supported at its cylindrical end is determined as the turntable is rotated. Then, the angle which the axis of revolution of the end portion makes with the axis of rotation is determined. From these determinations, the angle between the fiber axis and the axis of revolution is determined. In response to that angle, the projections of which are determined in orthogonal planes, the support for the plug is tilted to cause the fiber axis to be parallel substantially to the axis of rotation.

Following the correction of the exit angle, a light beam again is projected along the passageway and an image is acquired of the cross sectional area of the light beam while relative circular motion is caused between the beam of light and the device which is used to acquire the image. The beam of light emanating from the end face of the plug occupies different positions along a circular path, the center of which is the axis of rotation of the turntable. The centroid of the cross sectional area of the light beam is determined at a plurality of points which are sufficient in number to determined the circular path it traces, and the center of rotation of the turntable is determined. Independent motions of the support are caused to occur in orthogonal directions until the acquired image is coincident with the axis of rotation of the turntable. Afterwards, the alignment surface of the plug is reconfigured to provide a new truncated conically shaped configuration having an axis which is parallel to the axis of rotation and having a centroid of the emitted light at the end face of the fiber which is coincident with the axis of rotation.

It is to be understood that the term reconfiguring is intended to cover various techniques for causing the plug to be restructured to cause it to have a conical surface having an axis of revolution which is coincident with the centroidal axis of the end portion of the optical fiber. Such techniques include grinding a molded plastic plug or machining a metal plug.

BRIEF DESCRIPTION OF THE DRAWINGS

Other objects and features of the present invention will be more readily understood from the following detailed description of specific embodiments thereof when read in conjunction with the accompanying drawings, in which:

FIG. 1 shows an elevational view of an apparatus which is used to reconfigure a truncated, conically shaped optical fiber terminating plug in accordance with the methods of this invention;

FIG. 2 is an elevational view of a biconic connector arrangement for optical fiber cables which includes an alignment sleeve and two plugs each of which terminates an optical fiber;

FIG. 2A is a detail elevational view of a connector arrangement which includes two cylindrical plugs and an alignment sleeve;

FIG. 3 is a detail view of a portion of a biconic connector plug;

FIG. 4 is a detail view of end portions of two plugs held within an alignment sleeve;

FIGS. 5A-5B are detail views of plug end portions which terminate optical fibers to show a lateral offset and exit angle condition which may exist and to show the desired configuration in which the centroidal axis of the fiber core coincides with the axis of revolution of the end portion of a plug, the fiber cores in these views being exaggerated for purposes of clarity;

FIG. 6 is an enlarged view of two plug end portions in an alignment sleeve to show misalignment of fiber cores;

FIG. 7 is a detail view of a plug end with axes of interest shown;

FIGS. 8-9 are views of plugs having the same apparent exit angle although they have different conical and fiber core axes relative to a reference axis;

FIG. 10 is a perspective view of a coordinate system convention which is used in the methods of this invention;

FIG. 11 is an enlarged view of a plug end to show the location of two focal planes at which images of a light beam are acquired;

FIG. 12 is a perspective view which shows the components of an angle referred to as the exit angle;

FIG. 13 is an enlarged view of a plug end after it has been polished;

FIGS. 14A-B are detail plan and elevational views of a holder for a plug;

FIG. 15 is a detail view of a pedestal which supports the holder of FIG. 14;

FIG. 16 is a side elevational view of a support for a biconic connector plug;

FIG. 17 is a plan view of the support of FIG. 16;

FIG. 18 is an elevational view of a portion of the apparatus of FIG. 1 which is used to reshape the conical configuration of a plug in response to measurements of angular and lateral offset;

FIG. 19 is a plan view of the apparatus of FIG. 18;

FIGS. 23-25 are a sequence of views which depict steps in the angular reorientation of a plug;

FIG. 26A is a plan view of a sensing device;

FIG. 26B is a schematic view of portions of the apparatus of FIG. 1 with the sensing device of FIG. 26A mounted on a plug;

FIGS. 29-31 are a sequence of views which depict sleps in a method of correcting for lateral offset.

DETAILED DESCRIPTION

Figure 20:
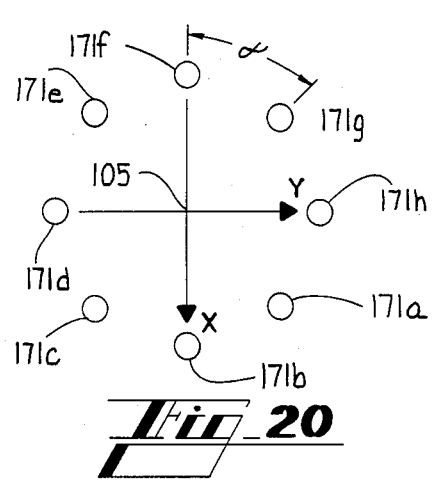
FIGS. 20-22 are a sequence of views which depict steps of a method of measuring the exit angle of a biconic connector plug.

Referring now to FIG. 1, there is shown an apparatus 35 which includes a rotatably and reciprocally mounted grinding tool 37 that is used to reconfigure a portion of a biconic connector which is designated generally by the numeral 40 and which is shown in FIGS. 2 and 3. The biconic connector 40 includes a housing 42 for receiving two plugs 44—44 each of which terminates a lightguide or optical fiber 45 having a core 43. Both the plug and portions of the housing are made of a crushed silica, transfer molding grade epoxy composition, for example. As can be seen in FIG. 3, each plug 44 includes a cylindrical portion 46 which includes a bore 48, and an end portion 50 having a truncated conical shape. The end portion 50 which also is referred to as the primary pedestal includes a passageway 52 that communicates with the bore 48. It should be understood that other arrangements also are possible. FIG. 2A shows another arrangement in which two plugs 51—51 are cylindrical.

A coated single optical fiber 45 which has been jacketed with a plastic material such as polyvinyl chloride may be terminated with a plug 44 at each of its ends. The terminated, jacketed optical fiber is referred to as a single fiber or jumper cable 55. The jacketing material and the coating may be removed from an end portion 54 of the single fiber cable. The cable is inserted into the bore 48 until the bared end portion 54 is received in the passageway 52 with an end portion of the fiber 45 extending into a secondary pedestal 56 having an end face 57. In the alternative, a plug is molded about an end portion of an optical fiber. After being polished in accordance with methods and apparatus disclosed and claimed in U.S. Pat. No. 4,539,776 which issued on Sept. 10, 1985 in the name of F. R. Weaver, Jr., an end face of the fiber 45 is coincident with the end face 57 of the secondary pedestal 56. The cable at its exit from the bore 48 is provided with a strain relief member 58 (see FIG. 3).

Each plug 44 is provided with retaining rings 60 and 62. The retaining ring 60 abuts a collar 65 which is fixedly located about the plug 44. A compression spring 64 is disposed about the cylindrical portion 46 of the plug between the collar 65 and a collar 67. The plug 44 is positioned in an end portion of a threaded holder 66 with the collar 67 in engagement with an annular lip 68 interior to the holder. The retaining ring 62 is disposed about the cylindrical portion 46 of the plug 44 on the other side of the lip 68 to hold the plug within the holder. A threaded portion 74 extends from the holder 66 and the single fiber cable 55 extends in the other direction from within the holder 66.

A center portion 76 of the housing 42 is adapted to receive the two threaded plug holders and two plugs 44—44. The center portion 76 includes two opposed internally threaded cavities 78—78 and a flange 80 adapted to be mounted to a supporting surface. The flange 80 is aligned with an internally disposed annular collar 82 which extends toward a longitudinal axis 83 of the plug. An axis 84 is the axis of revolution of the truncated conically shaped end portion 50 and often is referred to as the conical axis. The center portion 76 of the housing also is adapted to receive an alignment sleeve 86 which comprises two opposed truncated, conically shaped cavities 88 and 90 which meet at a common plane 92.

The alignment sleeve 86 is disposed within the portion 76 of the housing so that when the plugs 44—44 are mounted in the holders 66—66 and the threaded portions 74—74 turned into the cavities 78—78, the end portions 50—50 of the plugs are received in the cavities 88 and 90 with the secondary pedestals in the vicinity of the common plane 92. Also, as the threaded portions 74—74 are turned into the housing portion 76, the plug portions 46—46 are moved through the openings defined by the lips 68—68 to move the retaining rings 62—62 out of engagement with the lips (see left side of FIG. 2). The retaining ring 60 of the left plug as viewed in FIG. 2 is adjacent to a sleeve retaining ring 94. The spring 64 causes the plug end portion 50 to be seated firmly in engagement with a wall 96 of the alignment sleeve. The ring 94 is threadably secured inside the housing portion 76 and although not necessarily in engagement with the sleeve, it prevents the sleeve from being removed inadvertently from the housing. Further, the right plug end 50 as viewed in FIG. 2 is moved into the cavity 88 of the alignment sleeve 86 and contacts a wall 98. The sleeve 86 may float within an opening 99 in the collar 82 to facilitate alignment of the two plugs 44—44.

Ideally, to achieve minimum loss, the plugs 44—44 disposed within the sleeve 86 should have the axes of revolution of the conical end portions 50—50 aligned and end faces 57—57 of the fibers within the secondary pedestals 56—56 contacting each other (see FIG. 4) with centroidal axes of end portions of the fiber cores being substantially coincident with the axes of revolution. The outer surface of the conical end portion 50 of each plug 44 and the surfaces of the walls 96 and 98 (see FIG. 2) of the sleeve cavities are associated alignment surfaces which are intended to cause the desired positioning of the pedestals 56—56 when the conical end portions of the plugs are received in the sleeve 86. The problem is that a centroidal axis 101 (see FIG. 5A) of the optical fiber core in the passageway in the plug as molded is not necessarily coincident with the conical axis 84 of the end portion of the plug. Generally, for low losses, the centroidal axis 101 of an end portion of a fiber core disposed in the plug 44 must be in a predetermined location with respect to a lateral alignment surface of the plug. For the plug 44, the lateral alignment surface is the surface of revolution of the conically shaped end portion 50.

Referring now to FIG. 5A, there are shown lateral and angular offsets which may exist when using as-molded plugs in an end face. As can be seen in FIG. 5A, an end face 57 of the optical fiber terminates in a pedestal 56 and is perpendicular to the conical axis 84. However, the centroidal axis 101 of the optical fiber core typically is not coincident with the conical axis 84. Generally, it has a lateral offset therefrom where the fiber intersects the end face of the pedestal 56, and further, it may have an angular offset or exit angle with respect to that axis such that a beam of light emerging from an end portion of an optical fiber is at an angle to the conical axis. As a result, when two plugs 44—44 are received in an alignment sleeve, the centroidal axes of the cores 43—43 being in a predetermined location with respect to those alignment surfaces are misaligned (see FIG. 6). The final product desirably includes a truncated, conically shaped end portion in which the centroidal axis of an end portion of the optical fiber core and the axis of revolution of the end portion 50 of the plug 44 are coincident (see FIG. 5B). The lateral and angular offsets are corrected by reconfiguring the end portion of the plug 44.

In prior art manufacture, in order to achieve acceptable characteristics in finished plugs, the end portions of the plugs have been reconfigured based upon visual observations by an operator and the subjective correction controlled by the operator. It is desired to have those observations and corrections based upon observations made without being subject to human error. Furthermore, it has been found that the operator cannot observe the exit angle of a pre-polished plug-terminated fiber and correct for it. For a plug-terminated optical fiber, this goal is accomplished by determining, without operator input, the angular and lateral offsets, and then in response to those determinations, repositioning the plug and reconfiguring its end portion to cause its axis of revolution to coincide with the centroidal axis of the core of the optical fiber therein or with that of the passageway if it is a plug to be field-terminated. The remainder of this description deals with the adjustment of a plug 44 which terminates an optical fiber.

Exit angle correction is made to insure that the optical fiber core axis 101 (see FIG. 5B) will be parallel to the conical axis 84 after the conical end portion 50 of the plug is reshaped and that the fiber end face is perpendicular to the fiber axis and the conical axis after polishing. Generally, it is not possible to determine the axis of the optical fiber with respect to a reference axis such as an axis 105 (see FIGS. 1 and 7) of a supporting means for the plug, hereinafter referred to as the axis of rotation by merely observing the apparent position of a beam of light 107 emitted from the core in different focal planes. For purposes of this discussion, the emitted light beam 107 is taken to have its energy concentrated narrowly about a single ray. In other words, the intensity-weighted average over all emission angles is the angle for the ray propagation direction. The discrepancy between the observed and actual exit angles is caused by the fiber end face being other than perpendicular to the axis of rotation of the turntable. Also, the refraction of the light emitted from the fiber which occurs due to the 1.4 to 1 index of refraction ratio between glass and air is an additional physical effect which must be taken into account. The index of refraction of the fiber core is taken to be 1.4, but the invention is not limited to any particular index value.

In FIGS. 8 and 9 are illustrated the ambiguous character of exit angle error based only on the observation of light emanating from the end of the plug. FIG. 8 depicts a plug end portion in which is disposed a fiber having its axis 101 at an angle of 1 degree with the plug axis 84. After the plug has been prepared and mounted, its axis 84 lies parallel with the axis 105 of rotation and the end face of the fiber lies perpendicular to that axis 105. By refraction, light emanated from such a plug would be observed to propagate in air as a light beam 107 at an angle of 1.4 degrees with respect to the axis 105 of rotation. This situation can be contrasted with that depicted in FIG. 9. There the angle between the conical axis 84 and the fiber core axis 101 is 0.5 degree, which results in a refracted light beam propagating at an angle of 0.7 degree with respect to the plug axis 84. However, an additional pitch of 0.7 degree has been added in this case, due possibly to the mounting arrangement. This causes the angle between the light beam 107 and the rotational axis 105 to be 1.4 degrees. Consequently, although the fiber core axes 101—101 in FIGS. 8 and 9 are at different angles to the axis 84, the light beam in FIG. 9 makes an angle of 1.4 degrees with the axis of rotation 105 as in the case depicted in FIG. 8. With only information about the direction of the light beam measured with respect to the axis of rotation, the two cases illustrated in FIG. 8 and FIG. 9 would be indistinguishable.

In summary, to process and reconfigure a plug 44 requires mounting and holding the plug, which leaves the conical axis 84 displaced from an axis 105 of rotation of the support. Further, because of manufacturing imperfections, the axis 101 of the core 43 of the fiber 45 terminated in the plug 44 is displaced from the axis 84. The methods and apparatus of this invention are effective to provide a plug 44 in which the centroidal axis 101 of an end portion of the fiber core 43 is substantially coincident with the rotational axis 105.

In order to reconfigure the end portion 50 of plug 44 to cause the fiber core axis 101 to be coincident with the conical axis 84, it first becomes necessary to determine the space angle from the rotational axis 105 to the beam of light 107 emitted from the end portion of the optical fiber in the end portion 50 of the biconic plug. The first step in detecting and measuring exit angle is to establish a frame of reference in three dimensions to which angles and positions can be referred for each new plug to be measured. In determining angles, the apparatus 35 refers to the center of symmetry of light images emitted from the plug 44 detected as the turntable rotates. This also is the axis 105 around which the apparatus 35 reshapes the end portion of the plug.

For this description, an axis which is substantially parallel to the axis of rotation, and which is the focus-defocus axis, is called the Z axis. The X axis is normal to the Z axis, as is the Y axis (see FIG. 10). The space angle is determined by viewing the cross section of the beam of emitted light first at a near field which may be, for example, at the end face of the plug (see FIG. 11). Then the emitted light is viewed in a plane spaced above that of the near field in what is referred to as a far field. The angle between the centroidal axis through the centroids of these circles of light, as measured from a vertical axis, is designated $\psi$ (see FIG. 10).

Considering coordinate X and Y planes which intersect in the vertical Z axis (see FIG. 12), it becomes possible to determine the coordinate components of the angle $\psi$. If it is assumed that the beam of emitted light from the optical fiber can be represented by a space vector, then the projection of the vector into the Y=0 plane results in a line which is at an angle $\phi$ (see FIG. 12) to the vertical or Z axis. Similarly, the projection of the vector into the other vertical coordinate plane, the X=0 plane, results in a line which is at an angle $\theta$ to the vertical axis.

Prior to the measurement and further processing of the plug 44, its end face 57 is polished in accordance with the disclosure of priorly mentioned U.S. Pat. No. 4,539,776. When so polished the end face 57 is normal to the conical axis. After reconfiguring, when the end face is again polished, the axis 101 of the fiber core 43 which initially may have intersected the conical axis in the plane of the end face is more offset from the conical axis in the plane of the end face newly formed by the polishing operation (see FIG. 13.)

Unlike prior art techniques in which measurements were taken of a truncated conically shaped end portion of a plug which was supported in an opening defined by a mating surface, this invention is directed to an automatic technique for reconfiguring a plug end portion. Consequently, the plug 44 cannot be mounted by contacting the conical surface of its end portion, rather it must be held at its lower end to expose the conically shaped end portion to a tool.

Accordingly, an operator causes a plug 44 having a truncated, conically shaped end portion to become held in a chuck 111 which comprises a V-block 112 having a pivotally mounted retaining lever 114 (see FIGS. 14A-14B) so that its truncated, conically shaped end portion is exposed. The plug is held in the chuck 111 so that its annular groove is disposed just below a surface 116 of the chuck to permit a leaf spring (not shown) to become disposed in the groove and further hold the plug in the chuck.

The chuck 111 is supported on a pedestal 120 (see FIG. 15) which permits it to be exposed to the grinding tool 37. The pedestal 120 is supported through a mounting ring 123 by a spherical bearing 124 which is mounted on a turntable 130 (see FIGS. 16 and 17) having the fixed axis of rotation 105. In elevating the plug from the spherical bearing 124, the pedestal 120 facilitates bending of the fiber cable 55. Secondly, the tip of the plug 44 is elevated so that it is positioned at the center of curvature of the spherical bearing. As can be seen in FIG. 15, the plug 44 is held at its base which allows the tip of the plug to wobble, be it ever so slightly.

As can be seen in FIGS. 16 and 17, the bearing 124 is engaged by a mating surface 132 of a support 134, which is mounted on the turntable 130. The bearing 124 is adapted to be tilted in angular coordinate directions $\theta$ and $\phi$ by a positioner 140 including arms 136 and 138 each of which extends through the support 134 from an arm 139 which is mounted pivotally in a support 141. The $\theta$ axis controls angular motion parallel to the plane $X=0$ (see FIG. 12) whereas the $\phi$ axis controls rotation which is parallel to the plane $Y=0$. An end of each arm 139 is engaged by a plunger 142 of a precision motor 143. A spring 145 urges each arm 136 and 138 in a direction outwardly of the bearing.

Further as can be seen in FIGS. 16 and 17, the bearing support 134 is adapted to be moved in X and Y coordinate directions by a translator portion of the positioner 140. Each portion of the translator includes a force applicator 151 mounted at one end of an arm 153 that is engaged by a plunger 155 of a precision motor 157. The arm 153 is supported for pivotal movement in a bearing 158 and is biased outwardly by a spring 159.

It also should be understood that whereas in the preferred embodiment of this invention, the axis 105 of rotation of the turntable 130 is vertical, the invention is not so limited. The axis of rotation could just as well be adapted to be horizontal with the end face of the fiber and pedestal being vertical and normal thereto.

Each plug is mounted using its cylindrical portion as a reference surface. Although efforts are made to assure that the axis 83 of the cylindrical portion and conical axis 84 are aligned, small disturbances such as molding flash or fixture misalignment can contribute to angular shift in the conical axis with respect to the axis 105 of rotation of the turntable.

In a preferred embodiment, the initial tilt of the plug 44 as held on the turntable 130 or the gravitational effect as it may be called is not corected at the outset. Rather, the angle of the light beam 107 is adjusted subsequently to compensate for the gravitational effect.

Prior to beginning the grinding operation to reconfigure the end portion of the plug, the center of the fiber core 43 exposed on the end surface of the plug must lie on the axis of rotation of the turntable and the axis of the fiber core must be parallel to the axis of rotation of the turntable. Information is obtained as to misalignment, from lateral offset or angular error by introducing light from a source 158 (see FIG. 18) Into that end of the jumper cable 55 not being processed, and processing light emitted from the end to be reconfigured by a machine vision system 160. Examples of commercially available machine vision systems are one manufactured by International Robomation Intelligence, Inc. and designated P256, and one manufactured by View Engineering Co. and designated model 719. A machine vision system is a system which acquires images emanating from an article and provides an output based on an analysis of the acquired images. Such an analysis can be used to determine properties of the article such as, for example, orientation and changes in those properties as a result of an action taken in response to the output. Use of this information guarantees that the apparatus 35 will shape a truncated cone around the appropriate axis, which is coincident with the light propogation direction, so that a mating part receives transmitted light at a well-defined position and in a direction normal to its surface.

After the plug has been clamped in the apparatus 35, the turntable 130 is caused to rotate (see FIGS. 18-19) and the fiber core axis 101 and the rotational axis 105 determined in accordance with the methods of this invention. Light is caused to be launched from the source 158 into the other end of the optical fiber cable 55 terminated by a plug which is held in the moveable chuck. The machine vision system 160 is used to determine the location of centroid of the fiber core 43 when the core is illuminated by light projected into the other end of the jumper cable. A microscope 161 is mounted on a slideably moveable arm 162 (see FIG. 1). The arm 162 is caused to be moved to position the microscope above the plug.

An objective lens is focused at the end face of the optical fiber 45 and the spot of light which is emitted from the optical fiber in the plug 44 passes through the objective lens and an eyepiece 168 of the microscope 161 and is incident on a photosensitive surface of a camera 170 of the machine vision system. In the preferred embodiment, the vision system 160 acquires an image, via the camera 170 connected to the microscope 161, of the spot of light in 1/30th of a second, for example, by digitizing the analog output of the camera. Multiple observations 171—171 (see FIG. 20) are made at fixed angular intervals while the turntable rotates at a substantially constant rate, producing a set of observations which sample adequately a multiplicity of locations along a circular path which the spot of light traces out. These observations may be viewed by an operator on a monitor 174.

Having acquired the set of digitized images described hereinabove, the machine vision system 160 performs a predetermined feature extraction and calculates the centroid of the spot of light for each image. The centroids thus obtained are provided to a computer 176 (see FIG. 18) such as one manufactured by AT&T and designated PC 6300 for the purpose of processing them further. The circle on which these centroids are located is extracted from the data on their positions along the circular path they trace out.

In a perfectly aligned optical system, all circles in all near and far field positions of the objective lens are concentric. Inasmuch as this does not occur in the manufacturing apparatus 35, all observed circles are translated to cause their calculated centers to coincide. For every observation made in the near field, there is a corresponding point in the far field.

In measuring and correcting any axial misalignment, it becomes necessary to have a known frame of reference. A specific angular position called the upright position is used for reference (see FIG. 20). In the convention of this description, as viewed from above the apparatus 35, X values increase from top to bottom in the plane of the drawings and Y values increase from left to right. In the correction of core centers, a snapshot is taken at the upright position during the correction process. For a given location $(X_o, Y_o)$ in the $Z=Z_o$ plane (see FIG. 11) through the fiber end face and its corresponding location $(X_1, Y_1)$ in a $Z=Z_1$ plane, the angle $\psi$ can be determined. If the data is taken at an angle $\alpha$ from the upright position, then the data must be referenced to the upright position by a simple angular coordinate transformation.

Figure 21:
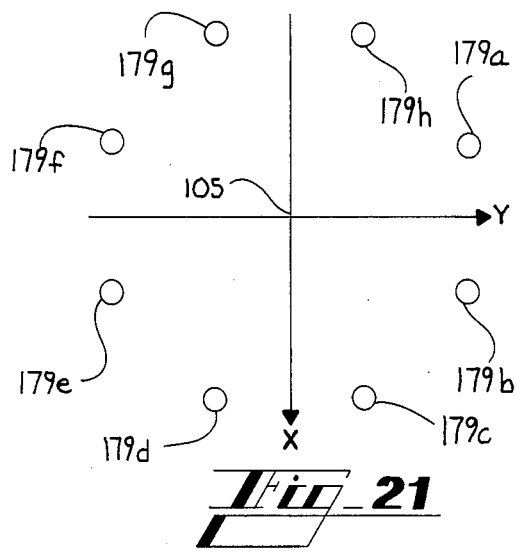

By observing the position of the core image in at least two object planes, $Z=Z_o$ and $Z=Z_1$, information about the angle of the fiber axis with respect to the conical axis is obtained and analyzed to determine the $\phi$ and $\theta$ offsets. Accordingly, the microscope 160 is refocused so that its focal plane is spaced above the plug (see FIG. 21) a distance of 0.002 inch, for example. An additional eight observations 179—179 are taken as the turntable rotates. These eight images or readings as they are called also are digitized, segmented and processed for feature extraction. The readings at the far field are translated until the center of a circle through these eight readings is coincident with the center of the circle through the eight readings in the near field. Both calculated centers are translated to a common origin and $\Delta X$ and $\Delta Y$ are calculated for each corresponding pair of observations in the spaced planes.

It should be noted that $\theta$ and $\phi$ are obtained from data in the upright position. For the other corresponding pairs of observations in the two spaced focal planes, it becomes necessary to bring each to the upright position by coordinate transformation and average the results as described earlier.

Figure 22:
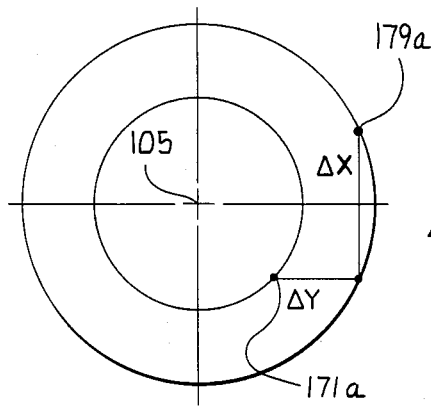

For each corresponding pair of observations, the tilt angles $\theta_L$ and $\phi_L$ beam of light are determined. The $\theta_L$ component is determined as $\tan^{-1}(\Delta Y/\Delta Z)$ and the $\phi_L$ component is determined as $\tan^{-1}(\Delta X/\Delta Z)$ (see FIG. 22), wherein $\Delta X=X_o-X_1$, $\Delta Y=Y_o-Y_1$, and $\Delta Z=Z_o-Z_1$ (see FIG. 11). In order to be of assistance in understanding the angular correction, FIGS. 23-25 depict $\theta$ components of angles determined in accordance with the methods of this invention. For example, FIG. 23 depicts the $\theta$ component of the angle which the beam of light makes with the axis of rotation. It should be understood that similar illustrations apply for the $\phi$ components.

From this data and from each two corresponding points in the near and far fields, the components, $\theta$ and $\phi$ of the angle $\psi$ are determined and stored. The stored angle component readings are compared to desired readings.

Figure 27:
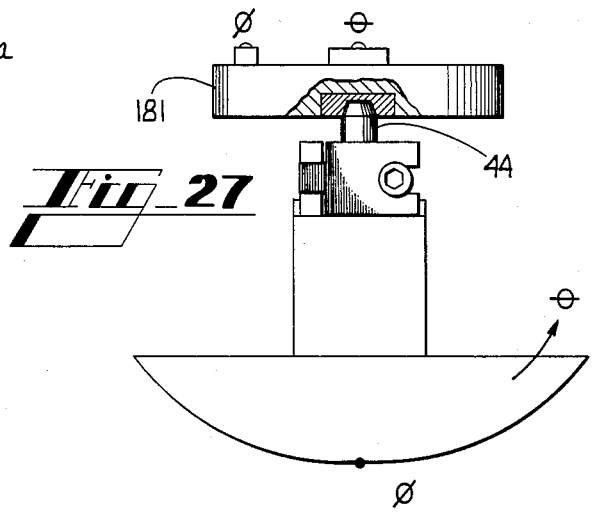
FIGS. 27 and 28 are views of the sensing device of FIG. 26A in engagement with an end portion of a plug.
Figure 28:
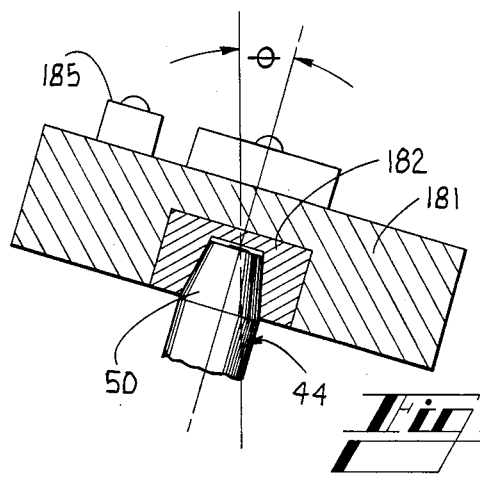

Next, the end portion misalignment contribution to the exit angle, that is the angular offset of the end portion from the rotational axis 105, is determined. This is accomplished with the help of a sensing device 180 which is adapted to be mounted on the conical end portion 50 of the plug 44 (see FIGS. 26A-26B). Such a sensing device also is shown in FIGS. 27 and 28 and includes a disc-like housing 181 having an insert 182 which includes a conically shaped opening 183. The housing is supported on a pivotally mounted arm 184 (see FIG. 19). Mounted within the housing are two leveling transducers 185 and 186, the two being at right angles to each other. The transducers are connected to a circuit 187 which provides a linear DC output proportional to angular displacement. The output is provided to an analog-to-digital converter 188 and to the computer 176 which is connected to a driver 178 (see FIG. 18) for the positioner 140.

The transducers are associated with bubble levels; resistance changes in the liquid are due to angular orientation changes. Angular displacement measurements are made with respect to the axis of rotation of the turntable, and with the tilt axes of the support aligned with the associated transducers. As can be seen in FIG. 28, when the sensing device is positioned on the plug, it engages the conical surface of the plug.

At this time, the sensing device 180 is used to determined the angular offset of the axis 84 of the end portion 50 with respect to a previously determined and fixed angular orientation of the turntable axis in $\theta$ and $\phi$ directions (see FIG. 27). These offsets are designated $\theta_G$ and $\phi_G$ and are distinguished from the emitted light beam angles. The $\theta_G$ component is depicted in FIG. 23. It should be emphasized that the conical axis angular offsets contribute to the light beam offsets.

In a next step of the method of this invention, the light beam offsets are reduced by the effects of the conical axis angular offsets. This is accomplished by subtracting $\theta_G$ and $\phi_G$ from $\theta_L$ and $\phi_L$ to provide $\theta_{L-G}$ and $\phi_{L-G}$. These values of $\theta$ and $\phi$ are those which would have been observed had the optical fiber end face been normal to the axis of turntable rotation at the time the core positions in the two focal planes were measured. In that instance $\theta_G$ and $\phi_G=0$. With n being the index of refraction of the fiber core, $\theta_F'$ and $\phi_F'$ are determined from the relationships $\theta_F'=(\theta_{L-G}/n)$ and $\phi_F'=(\phi_{L-G}/n)$. These values, $\theta_F'$ and $\phi_F'$ represent the true angular offsets of the fiber axis with respect to the conical axis. The value $\theta_F'$ is depicted in FIG. 24.

What remains is to adjust the current angular position of the plug 44 so that the fiber axis is parallel to the turntable axis. This is accomplished by tilting the plug 44 from its present position $\theta_G$, $\phi_G$ to a new position having an angle with the components $\theta_G'$ and $\phi_G'$ where $\theta_G'=-\theta_F'$ (see FIG. 25) and $\phi_G'=-\phi_F'$. In other words, the complete angular excursion to be effected involves a simultaneous nulling out of the errors $\theta_G$, $\phi_G$ due to the holder and support mechanisms, and the intrinsic exit angle errors $\theta_F'$ and $\phi_F'$ now isolated and independent of the former.

As a result of these determinations, and with the sensing device 180 still positioned on the plug, the computer 176 provides commands to motors 143—143 to cause the spherical bearing 124 to be tilted to cause the axis 101 of the optical fiber core to be parallel to the rotational axis 105. In FIG. 25 is depicted the plug 44 after it has been tilted to cause the axis 101 of the fiber core to be parallel to the axis 105 of rotation of the turntable.

As pictured in FIG. 25, the fiber core and conical axis are coincident at the same point in the end face of the plug. This generally is not true (see FIG. 5A). Accordingly, prior to reconfiguring the end portion, the sensing device 180 is removed, the microscope again moved into alignment with the plug 44 and another sequence of operations performed in order to correct for any lateral offset between the axis of rotation and the axis 101 of the optical fiber core. The microscope is refocused and the vision system 160 acquires an image via the camera 170 of the spot of light in 1/30th of a second by digitizing the analog output of the camera. Multiple observations such as diametrically opposed images 190a–190b (see FIG. 29) or a plurality 192a–192h (see FIG. 30) are made at fixed angular intervals while the turntable is rotated which sample adequately a multiplicity of locations along a circular path which the spot of light traces out. The machine vision system 160 performs a predetermined feature extraction and calculates the centroid of the spot of light for each image. Centroids thus obtained are provided to the computer 176. A circle-fitting algorithm or averaging method is used to obtain the center of rotation and the radius of the circle on which the spot is moving.

From this information, the lateral distance vector necessary to be traversed to produce coincidence of the spot of light in the center of rotation is found. This information is used to generate commands to the driver 178 of the positioner 140 to move the chuck 111. While this is being done, pictures are being taken and processed and used to provide additional commands to the positioner. The use of this interative procedure allows the plug 44 to be positioned such that a centroid 194 of the image of the core 43 of the end face of the optical fiber at the end of the pedestal is substantially coincident with the rotational axis 105 of the turntable (see FIG. 31).

Figure 32:
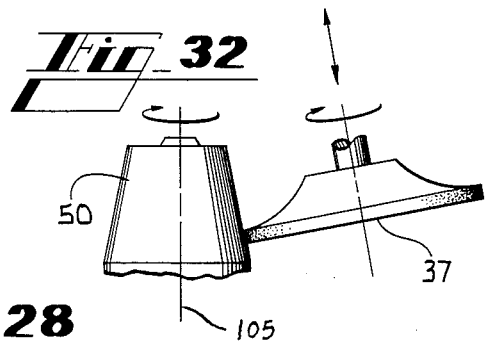
FIG. 32 is a detail view showing a grinding tool in engagement with a plug end portion.

At this time, all repositioning having been done, the grinder tool 37 is moved to cause the disc-like head to engage the conical end portion 50 of the plug 44 (see FIG. 32). The grinder head reconfigures the conical end portion 50 to provide a truncated conically end portion the axis of which is coincident with the axis of rotation of the turntable. Because the fiber axis 101 also is parallel or coincident with the axis of rotation, the fiber axis is substantially coincident with the conical axis. This results in a relatively low or zero exit angle and contributes to increased performance and higher yields over as-molded plugs.

If it assumed that the end face of the optical fiber is perpendicular to the conical axis prior to angular correction and grinding, then it will not be afterwards. Accordingly, after grinding, the end face of the fiber and plug pedestal must be repolished.

It should be understood that prior to the hereinbefore described measurements and reconfiguration, the apparatus 35 is calibrated to determine the direction of the axis of rotation. A conical reference surface is obtained simply by grinding a truncated conical surface on a calibration plug on the turntable. This reference surface can be used in conjunction with the sensing device 180 (see FIG. 26A) to compare the conical axis of the calibration plug, which is coincident with the axis of rotation, with the earth's gravitational field direction. The sensing device 180 which measures the orientation of the plug with respect to the earth's gravational field direction is placed on the end portion 50 of the plug to measure the tilt of the plug with respect to the mounting surface to which the turntable 130 is referenced. The mounting surface of the apparatus 35 is a granite surface plate which is capable of being leveled and held accurately, once oriented, typically to a precision of 0.01 degree. Subsequently, the deviation of the axis of revolution of the end portion of each plug to be reconfigured is determined with respect to the axis of rotation.

As disclosed hereinbefore, both the fiber axis orientation and the fiber end face orientation are unknown initially for an uncorrected plug and neither can be determined by simple observation of the light exiting the fiber as it rotates on the turntable. In another embodiment, this is overcome by orienting the fiber end face, which is normal to the axis of revolution of the conical surface, so that it is perpendicular to the turntable axis 105 prior to making any observations of emitted light.

Afterwards, light is launched into the optical fiber, and near and for field readings are taken to permit a determination of the angle $\psi$ in accordance with the technique of the preferred embodiment. Then the sensing device 180 is repositioned on the end portion of the plug and the plug is caused to be tilted to cause the fiber axis to be parallel to the axis of rotation. Following the angle correction, the plug is moved laterally to cause the centroid of the fiber axis at the plug end face to be coincident with the axis of rotation. The plug is ground and the resulting product has a fiber care axis along an end portion of the plug which is substantially coincident with the axis of rotation and also with the axis of revolution of the newly formed conical alignment surface of the plug. As can be seen, the preferred embodiment eliminates the initial step of positioning the sensing device on the plug and performs this step subsequent to the determination of the light beam angle components.

It is to be understood that the above-described arrangements are simply illustrative of the invention. Other arrangements may be devised by those skilled in the art which will embody the principles of the invention and fall within the spirit and scope thereof.

What is claimed is:

1. A method of reconfiguring an end portion of a plug which is adapted to terminate an end portion of an optical fiber, said method including the steps of:

holding the plug, which includes a passageway within which is adapted to be disposed an end portion of an optical fiber, on a support having an axis of rotation, the plug being held such that the end portion of the plug is exposed;

causing relative motion between the axis of rotation and the plug to cause a centroidal axis of a beam of light within the passageway along the end portion of the plug to be substantially coincident with the axis of rotation; and reconfiguring the exposed end portion of the plug to cause the axis of the light beam in the end portion of the plug to be in a predetermined location with respect to an alignment surface of the reconfigured end portion.

2. The method of claim 1, wherein the plug has a truncated conically shaped end portion and the step of causing relative motion includes the steps of:

causing relative motion between the axis of rotation and the plug to cause an axis of a beam of light within the passageway along the end portion of the plug to be parallel to the axis of rotation;

determining the location of the centroid of the cross-sectional area of the light beam and the location of the axis of rotation in an end face of the plug; and causing relative motion between the plug and the axis of rotation to cause the centroid of the cross-sectional area of the light beam in the end face of the plug to be disposed along the axis of rotation.

3. The method of claim 1, wherein the end portion of the plug, which has a surface generated about an axis of revolution, is exposed, and the exposed end portion of the plug is reconfigured to cause the axis of the light beam in the end portion of the plug to be substantially coincident with the axis of revolution of the reconfigured end portion.

4. The method of claim 3, wherein an optical fiber cable is terminated by the plug and an optical fiber is disposed in the passageway.

5. The method of claim 3, wherein the beam of light is launched into the passageway of the plug.

6. A method of adjusting a truncated conically shaped end portion of a plug, which terminates an end portion of an optical fiber, to cause a centroidal axis of the optical fiber core in the end portion of the plug to be disposed along the axis of revolution of the conical surface of the plug, said method including the steps of:

holding the plug on a support having an axis of rotation, the plug being held such that the end portion of the plug is exposed;

launching a beam of light along the core of the optical fiber;

causing relative circular motion between the core and a device which is used to acquire an image of the illuminated cross-sectional area of the core to obtain locations of the illuminated core in planes at locations spaced along the axis of rotation;

determining the angle between the centroidal axis of the fiber core and the axis of revolution of the conical surface of the plug;

orienting the plug to cause the centroidal axis of the core in the end portion of the plug to be parallel to the axis of rotation;

determing the location of the axis of rotation in an end face of the plug;

causing the centroid of the cross-sectional area of the optical fiber core in the end face of the plug to coincide with the axis of rotation; and reconfiguring the truncated, conically shaped end portion of the plug to cause the centroidal axis of an end portion of the optical fiber core to be coincident with the axis of revolution of the reconfigured end portion.

7. The method of claim 6, wherein the location of the core is determined at a plurality of locations in a plane which passes through the end face of the plug and through a plurality of locations in the plane which is spaced from the end face of the plug and said method also includes the step of translating a center of the plurality of the locations in the plane spaced from the end face to be aligned with the center of those in the plane through the end face along a line parallel to the axis of rotation.

8. The method of claim 6, wherein the acquired image is processed to determine the centroid of its location which is compared to the location of the axis of rotation.

9. The method of claim 6, wherein the step of determining the angle between the centroidal axis of the fiber core and the axis of revolution of the conical surface of the end portion of the plug is accomplished by:

determining the angular offset between the axis of rotation and the beam of light; and adjusting the angular offset of the beam of light to remove the effect of the angular offset between the axis of rotation and the axis of revolution of the end portion of the plug;

and the plug is oriented to cause the axis of revolution of the end portion of the plug to be displaced by the adjusted angular offset from the axis of rotation.

10. An apparatus for reconfiguring an end portion of a plug, which is adapted to terminate an end portion of an optical fiber, said apparatus including:

support means having an axis of rotation for holding the plug, which includes a passageway within which is adapted to be disposed an end portion of an optical fiber, such that the end portion of the plug is exposed;

means for causing rotation of said support means;

means for projecting a beam of light along the passageway and for acquiring images of an illuminated cross-sectional area of the light beam in planes at locations spaced along the axis of rotation;

means for causing relative motion between the axis of rotation and the plug to cause the axis of the beam of light within the passageway along the end portion of the plug to be parallel to the axis of rotation;

means responsive to the relative motion between the axis of rotation and the plug for determining the centroid of the cross-sectional area of the light beam and the location of the axis of rotation in an end face of the plug;

moving means for causing relative motion between the plug and the axis of rotation to cause the centroid of the cross-sectional area of the light beam in the end face of the plug to coincide with the axis of rotation; and means responsive to the relative motion between the axis of rotation and the plug for reconfiguring the end portion of the plug to cause the axis of an end portion of the light beam to be in a predetermined location with respect to an alignment surface of the reconfigured end portion.

11. An apparatus for adjusting an end portion of a plug, which is adapted to terminate an end portion of an optical fiber, said apparatus including:

support means having an axis of rotation for holding the plug, which includes a passageway within which is adapted to be disposed on end portion of an optical fiber, such that the end portion of the plug which includes a surface generated about an axis of revolution is exposed;

means for causing rotation of said support means;

means for projecting a beam of light along the passageway and for acquiring images of an illuminated cross-sectional area of the ligh beam in planes at locations spaced along the axis of rotation to determine the orientation of the light beam with respect to the axis of rotation;

orienting means including means connected to said support means and sensing means for determining the orientation of the axis of revolution with respect to the axis of rotation for causing relative motion between the axis of rotation and the plug to cause the axis of the beam of light within the passageway along the end portion of the plug to be parallel to the axis of rotation;

means for determining the centroid of the cross-sectional area of the light beam and the location of the axis of rotation in an end face of the plug;

translating means for moving the plug to cause the centroid of the cross-sectional area of the light beam in the end face of the plug to coincide with the axis of rotation; and tool means responsive to relative motion caused by said orienting means and to movement caused by said translating means for reconfiguring the end portion of the plug to cause the axis of the end portion of the light beam to be coincident with the axis of revolution of the reconfigured end portion.

12. The apparatus of claim 11 wherein said tool means includes means for causing an end portion of the plug to have a truncated, conical shape and said orienting means includes means for determining the angle between the axis of the beam of light and the axis of revolution of the end portion as held in said support means.

13. The apparatus of claim 11, wherein said sensing means is used to determine orthogonal components of an angle which the axis of revolution of the plug makes with the axis of rotation, and wherein said device comprises;

a housing which has a cavity therein for receiving the end portion of the plug;

a pair of sensing members which are disposed orthogonally to each other, each one being disposed in one of the orthogonal directions; and means for determining the disposition of each of said sensing members relative to a reference value to indicate the orthogonal components of the angle which the axis of revolution of the end portion makes with the axis of rotation.

14. The apparatus of claim 13, which also includes means for causing said housing to be moved in coordinate directions.

15. An apparatus for adjusting a truncated, conically shaped end portion of a plug, which terminates an optical fiber of an optical fiber cable, to cause the axis of the optical fiber core to be disposed along the axis of revolution of the end portion of the plug, said apparatus comprising:

a turntable having an axis of rotation;

means supported from the turntable for holding the plug such that its conically shaped end portion is accessible and such that the plug may be reoriented angularly and be translated in coordinate directions;

a light source for launching a beam of light into the fiber core of the cable;

means for causing the turntable and the plug to be rotated about the axis of the turntable;

means including means for acquiring an image of the light beam for determining the location of the core in an end face of the plug and in a plane which is spaced from the end face of the plug and which is normal to the axis of rotation, the locations of the core in the end face and in the plane being determinative of an axis of the beam of light which is at an angle to the axis of rotation;

a sensing device for determining the orientation of the axis of revolution of the end portion of the plug with respect to the axis of rotation;

angular adjustment means responsive to the angle between the beam of light and the axis of rotation and to the orientation of the axis of revolution for orienting the plug to cause the centroidal axis of the fiber core to be disposed parallel to the axis of rotation;

translating means for moving the plug to cause the centroid of the cross-sectional area of the core to coincide with the axis of rotation in the end face of the plug; and tool means responsive to the orienting of the axis of the fiber core parallel to the axis of rotation and to the centroid of the fiber core being disposed along the axis of rotation for reconfiguring the conical end portion of the plug to cause the axis of the fiber core to be substantially coincident with the axis of revolution of the reconfigured end portion.

16. The apparatus of claim 15, wherein the reconfiguring is accomplished while said turntable is rotated.

17. The apparatus of claim 15, wherein said means for acquiring an image comprises a machine vision system.

18. The apparatus of claim 17, wherein said holding means is adapted to be moved in coordinate directions, and wherein said apparatus includes means for decreasing the angle between the beam of light and the axis of rotation by moving the plug to cause the axis of revolution to be moved relative to the axis of rotation until the centroldal axis of the fiber core is substantially coincident with the axis of rotation.

19. The apparatus of claim 18, wherein the machine vision system include provisions for digitizing and segmenting each acquired image.

20. The apparatus of claim 18, wherein said translating means and said angular adjustment means are connected to a general purpose digital computer.

21. The apparatus of claim 20, wherein said translating means also includes a motor which is associated with each coordinate direction, the motors being controlled by said computer.

22. A plug which is adapted to terminate an end portion of an optical fiber, said plug being reconfigured in accordance with the method of claim 1.

23. An optical fiber cable having an end portion of an optical fiber thereof terminated with a plug which has been reconfigured in accordance with the method of claim 1.

24. An optical fiber cable having an end portion of an optical fiber thereof terminated with a plug which has been reconfigured in accordance with the method of claim 6.

* * * * *